US012691665B2

(12) United States Patent
Wynne et al.

(10) Patent No.: US 12,691,665 B2
(45) Date of Patent: Jul. 28, 2026

(54) POLYPROPYLENE COPOLYMER BASED LINEAR TEAR MULTI-LAYER FILM

(71) Applicant: Cryovac, LLC, Charlotte, NC (US)

(72) Inventors: Ashley Cornell Wynne, Woodruff, SC (US); Pasquale Campanelli, Limbiate (IT)

(73) Assignee: Cryovac, LLC, Charlotte, NC (US)

( * ) Notice: Subject to any disclaimer, the term of this patent is extended or adjusted under 35 U.S.C. 154(b) by 58 days.

(21) Appl. No.: 18/704,981

(22) PCT Filed: Jun. 22, 2022

(86) PCT No.: PCT/US2022/034427
§ 371 (c)(1),
(2) Date: Apr. 26, 2024

(87) PCT Pub. No.: WO2023/075866
PCT Pub. Date: May 4, 2023

(65) Prior Publication Data
US 2024/0416631 A1      Dec. 19, 2024

Related U.S. Application Data

(60) Provisional application No. 63/273,227, filed on Oct. 29, 2021.

(51) Int. Cl.
B32B 27/08 (2006.01)
B32B 7/02 (2019.01)
(Continued)

(52) U.S. Cl.
CPC ............... B32B 27/08 (2013.01); B32B 7/02 (2013.01); B32B 27/306 (2013.01); B32B 27/32 (2013.01); B65B 9/06 (2013.01); B65B 53/02 (2013.01); B65D 75/004 (2013.01);
B65D 75/5805 (2013.01); B32B 2270/00 (2013.01); B32B 2307/414 (2013.01); B32B 2307/582 (2013.01); B32B 2307/7376 (2023.05); B32B 2439/40 (2013.01)

(58) Field of Classification Search
CPC .. B65D 75/002; B65D 75/004; B65D 75/006; B65D 75/5805; B32B 27/08; B32B 7/02; B32B 27/306
USPC .......... 229/87.01, 87.05; 206/494, 499, 497; 383/207
See application file for complete search history.

(56) References Cited

U.S. PATENT DOCUMENTS 3,273,302  A  *  9/1966  Walter .................... B65B 61/02
                                                           53/442
3,493,106  A  *  2/1970  Galli ...................... B65D 71/08
                                                           206/497
(Continued)

FOREIGN PATENT DOCUMENTS

JP          H04211936 A        8/1992

*Primary Examiner* — Chun Hoi Cheung
(74) *Attorney, Agent, or Firm* — Jason R. Womer

(57)          ABSTRACT

A product packaging that exhibits good linear tear behavior. The product packaging being a multi-layer film having an inner layer made from a blend of ethylene copolymer and polypropylene copolymer. The inner layer of the multi-layer film being a substantial proportion of the thickness of the multi-layer film. The multi-layer film having linear tear behavior even when a force is applied at an angle offset from the tear direction.

20 Claims, 8 Drawing Sheets

(51) Int. Cl.

| | | |
|---|---|---|
| *B32B 27/30* | (2006.01) | |
| *B32B 27/32* | (2006.01) | |
| *B65B 9/06* | (2012.01) | |
| *B65B 53/02* | (2006.01) | |
| *B65D 75/00* | (2006.01) | |
| *B65D 75/58* | (2006.01) | |

(56) References Cited

U.S. PATENT DOCUMENTS

| | | | | |
|---|---|---|---|---|
| 4,352,849 | A | * | 10/1982 | Mueller .............. B29C 61/0616 |
| | | | | 428/910 |
| 5,048,687 | A | * | 9/1991 | Suzuki .............. B65D 75/5833 |
| | | | | 229/87.05 |
| 6,006,907 | A | * | 12/1999 | Sato ................... B65D 75/5844 |
| | | | | 229/87.05 |
| 6,294,210 | B1 | | 9/2001 | Kuo |
| 10,189,621 | B2 | * | 1/2019 | Dayrit ..................... B32B 27/08 |
| 2010/0155292 | A1 | * | 6/2010 | Fell ................... B65D 85/1072 |
| | | | | 53/461 |
| 2012/0279882 | A1 | * | 11/2012 | Prahm ............... B65D 85/1072 |
| | | | | 53/148 |
| 2014/0224863 | A1 | * | 8/2014 | Revelly .................. B65B 11/48 |
| | | | | 229/87.05 |

* cited by examiner

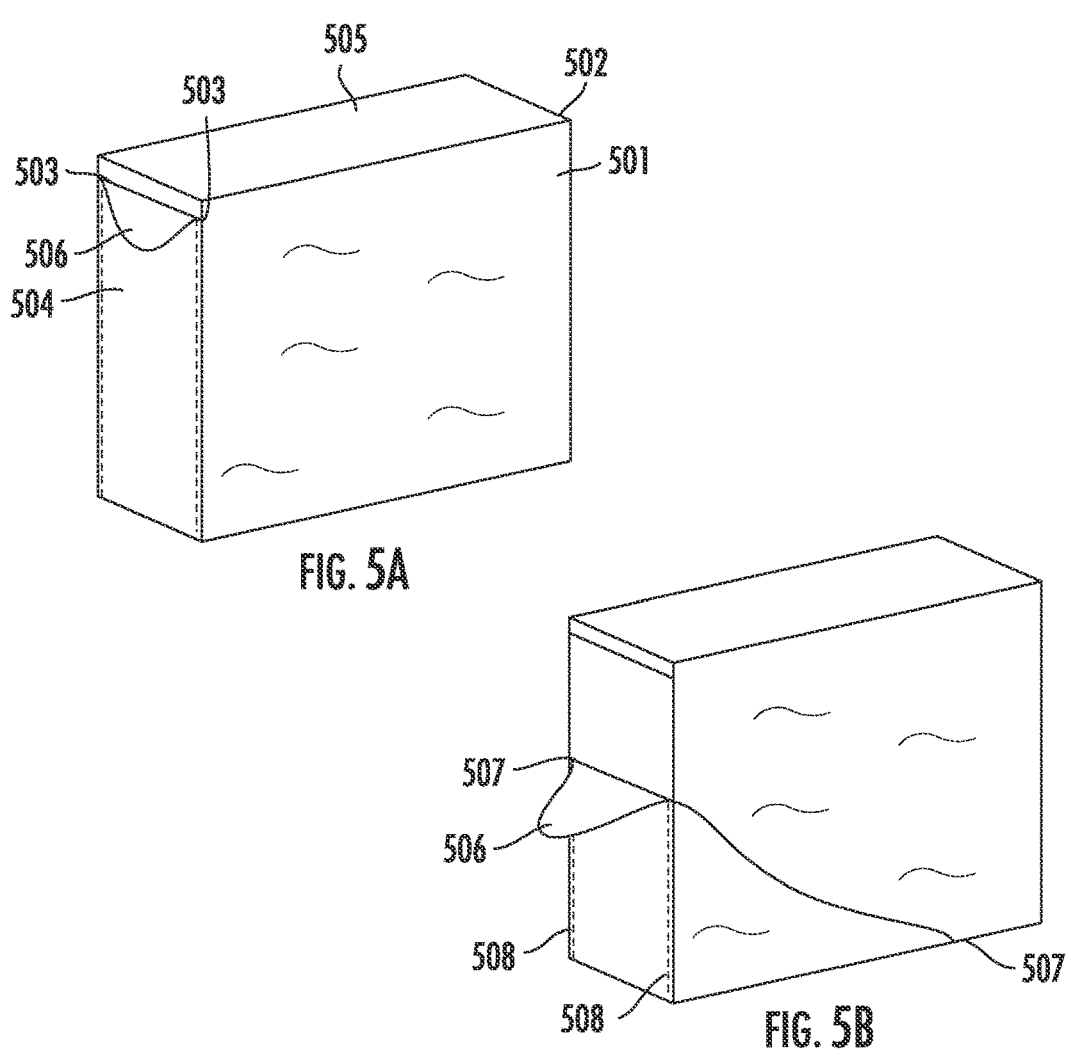
FIG. 5A
FIG. 5B
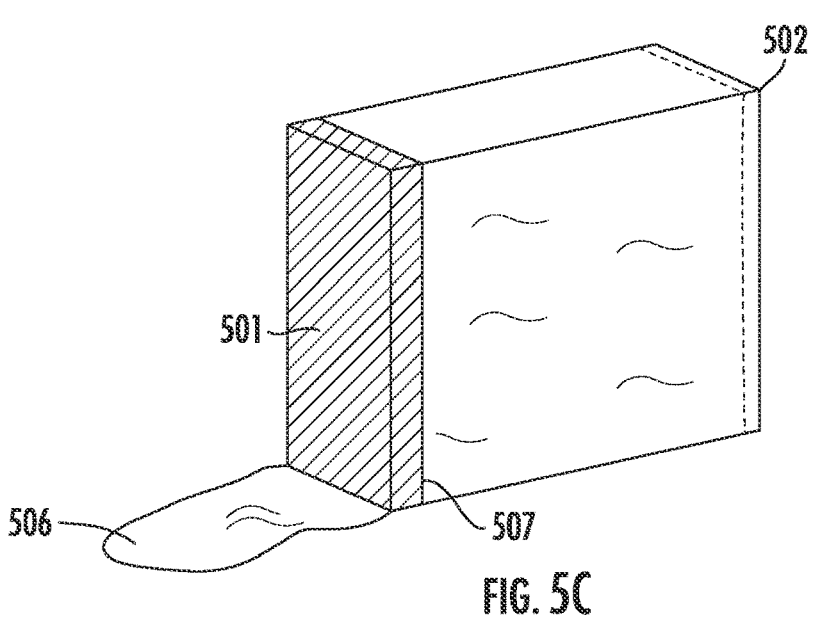
FIG. 5C

POLYPROPYLENE COPOLYMER BASED LINEAR TEAR MULTI-LAYER FILM

CROSS-REFERENCE TO RELATED APPLICATIONS

This application claims priority to U.S. Patent Application Ser. No. 63/273,227, filed Oct. 29, 2021 and entitled Polypropylene Copolymer Based Linear Tear Multi-Layer Film, the entirety of which is incorporated herein by reference.

BACKGROUND

The subject matter disclosed herein relates to a packaging film. More particular, the subject matter disclosed herein relates to a multi-layer packaging film that exhibits linear tear behavior.

Packaging films are used for the packaging of a variety of products. As the packaging films are shrunk to the package an attractive appearance is given to the product. High end consumer electronics are an example of products looking for a shrink film where the shrink film exhibits straight tear/linear tear performance when initiated. Current products in the market exhibit random tear behavior resulting in uneven tears and an unattractive appearance.

However, removing the packaging film can sometimes be difficult. Knives, blades and scissors are often used to open the packaging. However, use of these instruments increases the risk of injury for consumers and also risks damaging the product.

Moreover, the opening of such packaging requires more time and effort and may lead to frustration. Frustration with package opening can lead to a negative bias towards the packaged product.

In an effort to make the opening of packages easier, tear initiators have been used to initiate easier manual tearing of the packaging film. However, some films result in a tear that is jagged, and the tear line may deviate from the intended path resulting in an uneven tear.

The discussion above is merely provided for general background information and is not intended to be used as an aid in determining the scope of the claimed subject matter.

BRIEF DESCRIPTION

A product packaging that exhibits good linear tear behavior. The product packaging being a multi-layer film having an inner layer made from a blend of ethylene copolymer and polypropylene copolymer. The inner layer of the multi-layer film being a substantial proportion of the thickness of the multi-layer film. The multi-layer film having linear tear behavior even when a force is applied at an angle offset from the tear direction.

An advantage that may be realized in the practice of some disclosed embodiments of the product packaging is wrapped in a film that exhibits good linear tear properties, resulting in an appeasing opening appearance.

In one exemplary embodiment, a packaged product is disclosed. The packaged product comprises a first product and a multi-layer film shrunk to the outer surface of the first product. The multi-layer film comprises: a first outer layer having a first thickness; a second outer layer having a second thickness; and an inner layer comprising a blend of between 60-80 wt % polypropylene copolymer and between 20-40 wt % of an ethylene copolymer; a first intermediate layer disposed between the first outer layer and the inner layer; and a second intermediate layer disposed between the second outer layer and the inner layer. The thickness of the inner layer is at least 45% or 50% the thickness of the multi-layer film. The multi-layer film having at least one tear initiator to initiate tear propagation of the multi-layer film along a tear line. The multi-layer film having an Angled Tear Deviation Area when torn in at least one of the machine or transverse directions of not more than at least one of the values selected from 150 mm$^2$, 200 mm$^2$, 250 mm$^2$, 300 mm$^2$, 350 mm$^2$, 400 mm$^2$, 450 mm$^2$, 500 mm$^2$, 550 mm$^2$, 600 mm$^2$, 650 mm$^2$, 700 mm$^2$, 750 mm$^2$ and 800 mm$^2$, the Angled Tear Deviation Area being calculated from a 13 cm tear with a tear force applied at an angle of 26.6° offset from the desired linear tear path and measured in accordance an Angled Tear Deviation Test.

In another exemplary embodiment, a multi-layer is disclosed. The multi-layer film comprises a first outer layer having a first thickness; a second outer layer having a second thickness; and an inner layer comprising a blend of between 60-80 wt % polypropylene copolymer and between 20-40 wt % of an ethylene copolymer; a first intermediate layer disposed between the first outer layer and the inner layer; and a second intermediate layer disposed between the second outer layer and the inner layer. The thickness of the inner layer is at least 45% or 50% the thickness of the multi-layer film. The multi-layer film having an Angled Tear Deviation Area when torn in at least one of the machine or transverse directions of not more than at least one of the values selected from 150 mm$^2$, 200 mm$^2$, 250 mm$^2$, 300 mm$^2$, 350 mm$^2$, 400 mm$^2$, 450 mm$^2$, 500 mm$^2$, 550 mm$^2$, 600 mm$^2$ 650 mm$^2$, 700 mm$^2$, 750 mm$^2$ and 800 mm$^2$, the Angled Tear Deviation Area being calculated from a 13 cm tear with a tear force applied at an angle of 26.6° offset from the desired linear tear path and measured in accordance an Angled Tear Deviation Test.

In another exemplary embodiment, a method for packaging a product is disclosed. The method comprises the steps of providing a first product; wrapping the first product in a multi-layer film; sealing the multi-layer film; and shrinking the multi-layer film to cause the multi-layer film to fit taught around the first product. The multi-layer film comprising: a first outer layer having a first thickness; a second outer layer having a second thickness; and an inner layer comprising a blend of between 60-80 wt % polypropylene copolymer and between 20-40 wt % of an ethylene copolymer; a first intermediate layer disposed between the first outer layer and the inner layer; and a second intermediate layer disposed between the second outer layer and the inner layer. The thickness of the inner layer is at least 45% or 50% the thickness of the multi-layer film. The multi-layer film having an Angled Tear Deviation Area when torn in at least one of the machine or transverse directions of not more than at least one of the values selected from 150 mm$^2$, 200 mm$^2$, 250 mm$^2$, 300 mm$^2$, 350 mm$^2$, 400 mm$^2$, 450 mm$^2$, 500 mm$^2$, 550 mm$^2$, 600 mm$^2$, 650 mm$^2$, 700 mm$^2$, 750 mm$^2$ and 800 mm$^2$, the Angled Tear Deviation Area being calculated from a 13 cm tear with a tear force applied at an angle of 26.6° offset from the desired linear tear path and measured in accordance an Angled Tear Deviation Test.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIGS. 5A-5C are exemplary embodiments of a packaged product wrapped in a multi-layer film in accordance with embodiments herein.

DETAILED DESCRIPTION

Figure 1:
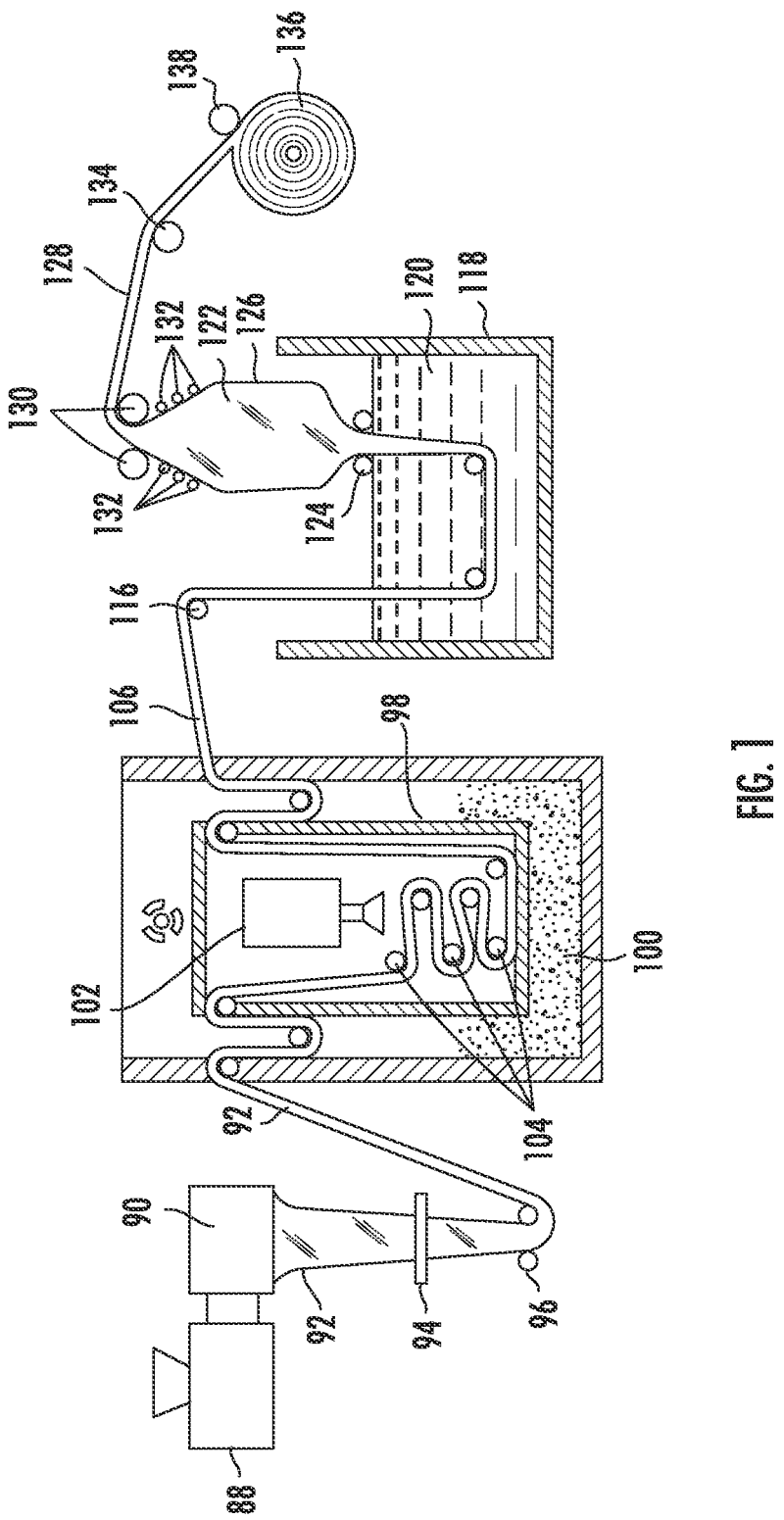
FIG. 1 is a schematic view of a process for making a multi-layer film in accordance with embodiments herein.

As used herein, the term "film" is inclusive of plastic web, regardless of whether it is film or sheet. The film can have a thickness of 3 mils or less, or a thickness of 2 mils or less, or a thickness of 1 mil or less. or a thickness of from 0.5 to 8 mils, or from 0.5 to 5 mils, or from 0.5 to 2 mils, or from 0.5 to 1 mil.

The multi-layer films described herein may comprise at least, and/or at most, any of the following numbers of layers: 5, 6, 7, 8, 9, 10, 11, 12, 13, 14 and 15. As used herein, the term "layer" refers to a discrete film component which is substantially coextensive with the film and has a substantially uniform composition. Where two or more directly adjacent layers have essentially the same composition, then these two or more adjacent layers may be considered a single layer for the purposes of this application. In an embodiment, the multi-layer film utilizes microlayers. A microlayer section may include between 10 and 1,000 microlayers in each microlayer section.

Below are some examples of combinations in which the alphabetical symbols designate the film layers. Where the multilayer film representation below includes the same letter more than once, each occurrence of the letter may represent the same composition or a different composition within the class that performs a similar function.

A/B/C/B/A. A/B/C/D/A, A/D/C/D/A, A/B/D/C/B/A, A/D/B/C/B/A, A/C/B/C/B/A, A/C/B/C/D/A, A/C/D/C/D/A, A/B/D/C/D/B/A, A/D/B/C/D/B/A, A/B/C/D/C/B/A, A/B/C/B/D/B/C/B/A.

"A" represents an outer layer, as discussed below.
"B" represents an intermediate layer, as discussed below.
"C" represents a linear tear layer, as discussed below.
"D" represents a bulk layer, as discussed below.

All compositional percentages used herein are presented on a "by weight" basis, unless designated otherwise.
Linear Tear Layer The multi-layer films described herein including a linear tear layer that makes up a substantial portion of the multi-layer film. The linear tear layer allows for the multi-layer film to tear easily enough that the film can be torn without the use of sharp instruments such as a blade, knife or scissors. The linear tear layer further imparts good linear tear propagation in the machine direction of the film. The multi-layer film tears leaving a relatively smooth edge having a clean look.

As used herein, the verb "to tear" refers to pulling an object apart by force. The noun "tear" refers to the resulting break in the object being torn. The tearing of the film results from placing the film under enough tension that it is pulled apart by the force. The pulling force is concentrated by a tear initiator, which allows a smaller pulling force to pull the film apart, i.e., tear the film.

With respect to the tearing of the film from which the packaging article is made, as used herein the phrase "the tear is capable of being propagated . . . " refers to the manner in which the film tends to propagate the tear when the film is subjected to an ordinary manual opening thereof.

The linear tear layer comprises a blend of between of between 60-80 wt % polypropylene copolymer and between 20-40 wt % of an ethylene copolymer. Suitable ethylene copolymers include, ethylene homopolymer such as low density polyethylene; ethylene/alpha olefin copolymer such as those defined hereinbelow; and other ethylene copolymers such as ethylene/vinyl acetate copolymer; ethylene/alkyl acrylate copolymer; or ethylene/(meth)acrylic acid copolymer. Ethylene/alpha-olefin copolymer herein refers to copolymers of ethylene with one or more comonomers selected from C4 to C10 alpha-olefins such as butene-1, hexene-1, octene-1, etc. in which the molecules of the copolymers comprise long polymer chains with relatively few side chain branches arising from the alpha-olefin which was reacted with ethylene. This molecular structure is to be contrasted with conventional high pressure low or medium density polyethylenes which are highly branched with respect to ethylene/alpha-olefin copolymers and which high pressure polyethylenes contain both long chain and short chain branches. Ethylene/alpha-olefin copolymers include one or more of the following: 1) high density polyethylene, for example having a density greater than 0.94 g/cm3, 2) medium density polyethylene, for example having a density of from 0.93 to 0.94 g/cm3, 3) linear medium density polyethylene, for example having a density of from 0.926 to 0.94 g g/cm3, 4) low density polyethylene, for example having a density of from 0.915 to 0.939 g/cm3, 5) linear low density polyethylene, for example having a density of from 0.915 to 0.935 g/cm3, 6) very-low or ultra-low density polyethylene, for example having density below 0.915 g/cm3, and homogeneous ethylene/alpha-olefin copolymers. Homogeneous ethylene/alpha-olefin copolymers include those having a density of less than about any of the following: 0.925, 0.922, 0.92, 0.917, 0.915, 0.912, 0.91, 0.907, 0.905, 0.903, 0.90, and 0.86 g/cm³. Unless otherwise indicated, all densities herein are measured according to ASTM D1505. In an embodiment, the ethylene copolymer is a linear low density polyethylene. In an embodiment, the ethylene copolymer has a density of from 0.915 to 0.935 g/cm³ measured according to ASTM D1505.

Suitable polypropylene copolymers include ethylene-propylene copolymers. In an embedment the ethylene-propylene copolymer has a density of from 0.860 to 0.920 g/cm³ measured according to ASTM D1505. In an embodiment the ethylene-propylene copolymer has a melt flow rate at 230° C./02.16 kg of from 6.0 to 9.0 g/10 min measured in accordance with ISO 1133.

In an embodiment, the linear tear layer comprises a blend of a linear low density polyethylene and an ethylene-propylene copolymer having an ethylene content of between 3-20 wt %. In another embodiment, the ethylene-propylene copolymer has an ethylene content of between of between 8-15 wt %. In another embodiment the linear tear layer comprises a blend of a linear low density ethylene/octene copolymer with an octene content of less than 9 wt % and a ethylene-propylene copolymer having an ethylene content of between 9-14 wt %.

The thickness of the linear tear layer is selected to provide sufficient tear properties to the multilayer film. The linear tear layer may have a thickness of at least any of the following values: 0.05 mils, 0.1 mils, 0.15 mils, 0.2 mils, 0.25 mils, 0.3 mils, 0.35 mils, 0.4 mils, 0.45 mils, 0.5 mils, and 0.6 mils. The linear tear layer may have a thickness less than any of the following values: 4 mils, 3, mils, 2 mils, 1 mil, 0.7 mils, 0.5 mils, and 0.3 mils. The thickness of the linear tear layer as a percentage of the total thickness of the film is at least any of the following values: 45%, 50%, 55%, 60%, 65%, 70%, 75% and 80%; and may range between any of the forgoing values (e.g., from 50% to 60% or between 45 and 80%).

Outer Layers

At least one of the outer layers is a heat seal layer. In embodiments, both outer layer layers of the film are heat seal layers. As used herein, the phrases "seal layer", "sealing layer", "heat seal layer", and "sealant layer", refer to an outer layer, or layers, involved in the sealing of the film to itself, another layer of the same or another film, and/or another article which is not a film.

As used herein, the term "heat-seal," and the phrase "heat-sealing," refer to any seal of a first region of a film surface to a second region of a film surface, wherein the seal is formed by heating the regions to at least their respective seal initiation temperatures. Heat-sealing is the process of joining two or more thermoplastic films or sheets by heating areas in contact with each other to the temperature at which fusion occurs, usually aided by pressure. The heating can be performed by any one or more of a wide variety of manners, such as using a heated bar, hot wire, hot air, infrared radiation, ultraviolet radiation, electron beam, ultrasonic, and melt-bead. A heat seal is usually a relatively narrow seal (e.g., 0.02 inch to 1 inch wide) across a film. One particular heat sealing means is a heat seal made using an impulse sealer, which uses a combination of heat and pressure to form the seal, with the heating means providing a brief pulse of heat while pressure is being applied to the film by a seal bar or seal wire, followed by rapid cooling of the bar or wire.

Heat seal layers include thermoplastic polymers, including, but not limited to thermoplastic polyolefin, polyamide, polyester, and polyvinyl chloride. In embodiments, polymers for the sealant layer include homogeneous ethylene/alpha-olefin copolymer, heterogeneous ethylene/alpha-olefin copolymer, ethylene homopolymer, and ethylene/vinyl acetate copolymer. In some embodiments, the heat seal layer can comprise a polyolefin, particularly an ethylene/alpha-olefin copolymer. For example, a polyolefin having a density of from 0.88 g/cc to 0.917 g/cc, or from 0.90 g/cc to 0.917 g/cc, or less than 0.92 g/cc. More particularly, the seal layer can comprise at least one member selected from the group consisting of high density polyethylene, linear low density polyethylene, medium density polyethylene, low density polyethylene, very low density polyethylene, homogeneous ethylene/alpha-olefin copolymer, and polypropylene. "Polymer" herein refers to homopolymer, copolymer, terpolymer, etc. "Copolymer" herein includes copolymer, terpolymer, etc.

As used herein, the term "polyolefin" refers to olefin polymers and copolymers, especially ethylene and propylene polymers and copolymers, and to polymeric materials having at least one olefinic comonomer. Polyolefins can be linear, branched, cyclic, aliphatic, aromatic, substituted, or unsubstituted. Included in the term polyolefin are homopolymers of olefin, copolymers of olefin, copolymers of an olefin and a non-olefinic comonomer copolymerizable with the olefin, such as vinyl monomers, modified polymers of the foregoing, and the like. Modified polyolefins include modified polymers prepared by copolymerizing the homopolymer of the olefin or copolymer thereof with an unsaturated carboxylic acid, e.g., maleic acid, fumaric acid or the like, or a derivative thereof such as the anhydride, ester metal salt or the like. It could also be obtained by incorporating into the olefin homopolymer or copolymer, an unsaturated carboxylic acid, e.g., maleic acid, fumaric acid or the like, or a derivative thereof such as the anhydride, ester metal salt or the like. In an embodiment, the heat seal layer is mainly composed of polyolefin. In an embodiment, the heat seal layer has a total polyolefin content of from 50 to 90 wt % based on the total composition of the heat seal layer. In an embodiment, the heat seal layer has a total polyolefin content of from 70 to 90 wt % based on the total composition of the heat seal layer. In an embodiment, the heat seal layer has a total polyolefin content of at least any of the following values, 50 wt %, 55 wt %, 60 wt %, 65 wt %, 70 wt %, 75 wt %, 80 wt %, 85 wt %, 90 wt % or 95 wt % based on the total composition of the heat seal layer.

Ethylene homopolymer or copolymer refers to ethylene homopolymer such as low density polyethylene; ethylene/alpha olefin copolymer such as those defined hereinbelow; and other ethylene copolymers such as ethylene/vinyl acetate copolymer; ethylene/alkyl acrylate copolymer; or ethylene/(meth)acrylic acid copolymer. Ethylene/alpha-olefin copolymer herein refers to copolymers of ethylene with one or more comonomers selected from C4 to C10 alpha-olefins such as butene-1, hexene-1, octene-1, etc. in which the molecules of the copolymers comprise long polymer chains with relatively few side chain branches arising from the alpha-olefin which was reacted with ethylene. This molecular structure is to be contrasted with conventional high pressure low or medium density polyethylenes which are highly branched with respect to ethylene/alpha-olefin copolymers and which high pressure polyethylenes contain both long chain and short chain branches. Ethylene/alpha-olefin copolymers include one or more of the following: 1) high density polyethylene, for example having a density greater than 0.94 g/cm³, 2) medium density polyethylene, for example having a density of from 0.93 to 0.94 g/cm³, 3) linear medium density polyethylene, for example having a density of from 0.926 to 0.94 g/cm³, 4) low density polyethylene, for example having a density of from 0.915 to 0.939 g/cm³, 5) linear low density polyethylene, for example having a density of from 0.915 to 0.935 g/cm³, 6) very-low or ultra-low density polyethylene, for example having density below 0.915 g/cm³, and homogeneous ethylene/alpha-olefin copolymers. Homogeneous ethylene/alpha-olefin copolymers include those having a density of less than about any of the following: 0.925, 0.922, 0.92, 0.917, 0.915, 0.912, 0.91, 0.907, 0.905, 0.903, 0.90, and 0.86 g/cm³. Unless otherwise indicated, all densities herein are measured according to ASTM D1505.

In an embodiment, the heat seal layer has a melting point less than any of the following values: 220° C., 210° C., 200° C., 190° C., 180° C., 170° C., 160° C., 150° C., 140° C. and 130° C.; and the melting point of the heat seal layer may be at least any of the following values: 90° C., 100° C., 110° C., 120° C., 130° C., 140° C., and 150° C. All references to the melting point of a polymer, a resin, or a film layer in this application refer to the melting peak temperature of the dominant melting phase of the polymer, resin, or layer as determined by differential scanning calorimetry according to ASTM D-3418.

In embodiments where the heat seal layer comprises amorphous material, then the heat seal layer may not clearly display a melting point. The glass transition temperature for the heat seal layer may be less than, and may range between, any of the following values: 125° C., 120° C., 110° C., 100° C., 90° C., 80° C., 70° C., 60° C., and 50° C.; measured where the relative humidity may be any of the following values: 100%, 75%, 50%, 25%, and 0%. All references to the glass transition temperature ($T_g$) of a polymer was determined by the Perkin Elmer "half Cp extrapolated" (the "half Cp extrapolated" reports the point on the curve where the specific heat change is half of the change in the complete transition) following the ASTM D3418 "Standard Test Method of Transition Temperatures of Polymers by Thermal Analysis," which is hereby incorporated, in its entirety, by reference thereto.

In an embodiment the heat seal layer has a melt index or composite melt index of at least 0.5, 1.0, 1.5, 2.0, 2.5 or 3.0 g/10 min @190° C. and 2.16 kg measured in accordance with ASTM D1238.

The thickness of the heat seal layer may be selected to provide sufficient material to cause a strong heat seal bond, yet not so thick so as to negatively affect the characteristics of the film to an unacceptable level. The heat seal layer may have a thickness of at least any of the following values: 0.05 mils, 0.1 mils, 0.15 mils, 0.2 mils, 0.25 mils, 0.3 mils, 0.35 mils, 0.4 mils, 0.45 mils, 0.5 mils, and 0.6 mils. The heat seal layer may have a thickness less than any of the following values: 2 mils, 1 mil, 0.7 mils, 0.5 mils, and 0.3 mils. The thickness of the heat seal layer as a percentage of the total thickness of the film may be less that any of the following values: 25%, 20%, 15%, 10%, and 5%; and may range between any of the forgoing values (e.g., from 10% to 20%).

In an embodiment, the heat seal layer comprises from 30 to 70 wt % of a low density polyethylene copolymer or linear low density polyethylene copolymer having a melting point between 90-130° C. In an embodiment, the heat seal layer comprises from 10 to 40 wt % of a medium density polyethylene copolymer having a melting point between 90-140° C. In an embodiment, the heat seal layer comprises at least 50, 60, 70 wt % ethylene copolymer. In an embodiment, the heat seal layer comprises from 5 to 25 wt % of an ethylene/vinyl acetate copolymer. In an embodiment, the heat seal layer comprises at least 9 wt % ethylene/vinyl acetate copolymer. In an embodiment, the heat seal layer comprises one or more additives useful in thermoplastic films, such as, antiblocking agents, slip agents, antifog agents, colorants, pigments, dyes, antioxidants, fillers, radiation stabilizers, and antistatic agents. Useful additives may be include as a masterbatch. Additives include but are not limited to stearates such as metal stearates, zinc stearate and aluminum stearate, silica, ceramic beads, waxes such erucamide wax and oleamide wax.

Intermediate Layer

The film may comprise one or more intermediate layer. "Intermediate" herein refers to a layer of a multi-layer film which is between the outer layers of the film. "Intermediate layer" herein refers to a layer which is not an outer or surface layer, and is typically a central, tie or core layer of a film. "Outer layer" herein refers to what is typically an outermost, usually surface layer or skin layer of a multi-layer film, although additional layers, coatings, and/or films can be adhered to it.

An intermediate layer may be, for example, between the heat seal layer and the linear tear layer. An intermediate layer may be directly adjacent the heat seal layer, so that there is no intervening layer between the intermediate and heat seal layers. An intermediate layer may be directly adjacent the linear tear layer, so that there is no intervening layer between the intermediate and linear tear layers. An intermediate layer may be directly adjacent both the heat seal layer and the linear tear layer.

The intermediate layer may be a tie layer. A tie layer refers to an internal film layer that adheres two layers to one another. Useful tie polymers include thermoplastic polymers that may be compatible both with the polymer of one directly adjacent layer and the polymer of the other directly adjacent layer. Such dual compatibility enhances the adhesion of the tied layers to each other. Tie layers can be made from polyolefins such as modified polyolefin, ethylene/vinyl acetate copolymer, modified ethylene/vinyl acetate copolymer, and homogeneous ethylene/alpha-olefin copolymer. Typical tie layer polyolefins include anhydride modified grafted linear low density polyethylene, anhydride grafted (i.e., anhydride modified) low density polyethylene, anhydride grafted polypropylene, anhydride grafted methyl acrylate copolymer, anhydride grafted butyl acrylate copolymer, homogeneous ethylene/alpha-olefin copolymer, and anhydride grafted ethylene/vinyl acetate copolymer.

An intermediate layer may have a thickness of at least about, and/or at most about, any of the following: 0.05, 0.1, 0.15, 0.2, 0.25, 0.5, 1, and 2 mils. The thickness of the intermediate layer as a percentage of the total thickness of the film may be at least about, and/or at most about, any of the following: 1, 3, 5, 7, 10, 15, 20, and 25 percent.

In an embodiment, the intermediate layer comprises from 30 to 70 wt % of a low density polyethylene copolymer or linear low density polyethylene copolymer having a melting point between 90-130° C. In an embodiment, the intermediate layer comprises from 10 to 40 wt % of an ethylene-propylene copolymer having . . . . In an embodiment, the intermediate layer comprises from 5 to 25 wt % of an ethylene/vinyl acetate copolymer. In an embodiment, the intermediate layer comprises one or more additives useful in thermoplastic films, such as, antiblocking agents, slip agents, antifog agents, colorants, pigments, dyes, antioxidants, fillers, radiation stabilizers, and antistatic agents.

Bulk Layer

The film may comprise one or more other layers such as a bulk layer. Bulk layers are often a layer or layers of a film that can increase the abuse resistance, toughness, or modulus of a film. In some embodiments the film comprises a bulk layer that functions to increase the abuse resistance, toughness, and/or modulus of the film. Bulk layers generally comprise polymers that are inexpensive relative to other polymers in the film that provide some specific purpose unrelated to abuse-resistance, modulus, etc. In an embodiment, the bulk layer comprises at least one member selected from the group consisting of: ethylene/alpha-olefin copolymer, ethylene homopolymer, propylene/alpha-olefin copolymer, propylene homopolymer, and combinations thereof.

The bulk layer may have a thickness of at least about, and/or at most about, any of the following: 0.05, 0.1, 0.15, 0.2, 0.25, 0.5, 1, and 2 mils. The thickness of the bulk layer as a percentage of the total thickness of the film may be at least about, and/or at most about, any of the following: 1, 3, 5, 7, 10, 15, 20, and 25 percent. In an embodiment, the bulk layer comprises one or more additives useful in thermoplastic films, such as, antiblocking agents, slip agents, antifog agents, colorants, pigments, dyes, antioxidants, fillers, radiation stabilizers, and antistatic agents.

Multi-Layer Film

FIG. 1 illustrates a process for making a film. In the process illustrated in FIG. 1, various polymeric formulations solid polymer beads (not illustrated) are fed to a plurality of extruders (for simplicity, only extruder 88 is illustrated). Inside extruders 88, the polymer beads are forwarded, melted, and degassed, following which the resulting bubble-free melt is forwarded into die head 90, and extruded through an annular die, resulting in tape 92 which is preferably from about 10 to 20 mils thick, and preferably has a lay-flat width of from about 2 to 10 inches.

After cooling or quenching by water spray from cooling ring 94, tape 92 is collapsed by pinch rolls 96, and is thereafter fed through irradiation vault 98 surrounded by shielding 100, where tape 92 is irradiated with high energy electrons (i.e., ionizing radiation) from iron core transformer accelerator 102. Tape 92 is guided through irradiation vault 98 on rolls 104. Preferably, tape 92 is irradiated to a level of from about 40 to about 120 kGy, resulting in irradiated film 106, which is then passed over guide roll 116, after which irradiated film 106 is passed into and through hot water bath tank 118 containing hot water 120. In some embodiments, the hot water bath tank is an oven or steam bath. Irradiated film 106 is immersed in hot water 120 (in embodiments having a temperature of 185 to 210° F.) for a period of about 10 to about 100 seconds, i.e., for a time period long enough to bring the film up to the desired temperature for biaxial orientation. Thereafter, the resulting hot, irradiated film 122 is directed through nip rolls 124, and bubble 126 is blown, thereby transversely stretching hot, irradiated film 122 so that an oriented film 128 is formed. Furthermore, while being blown, i.e., transversely stretched, nip rolls 130 have a surface speed higher than the surface speed of nip rolls 124, thereby resulting in longitudinal orientation. As a result of the transverse stretching and longitudinal drawing, oriented film 128 is produced, this blown film having been both stretched at a ratio of from about 1:1.5 to about 1:6 and drawn at a ratio of from about 1:1.5 to about 1:6 in embodiments. In embodiments, the stretching and drawing are each performed at a ratio of from about 1:2 to about 1:4. The result is a biaxial orientation of from about 1:2.25 to about 1:36, or in embodiments, from about 1:4 to about 116. While bubble 126 is maintained between pinch rolls 124 and 130, oriented film 128 is collapsed by rollers 132, and thereafter conveyed through pinch rolls 130 and across guide roll 134, and then rolled onto wind-up roll 136. Idler roll 138 assures a good wind-up. This process can be carried out continuously in a single operation, or intermittently, e.g., as a two-stage process, in which the extruded, irradiated tape is wound up after irradiation, and, after a period of storage, unwound and subjected to heating and orienting in order to arrive at oriented film 128.

The resulting multi-layer film can be used to form bags, casings, thermoformed articles, etc., which, in turn, can be used for the packaging of products. While various embodiments are illustrated and described herein, other packaging structures, such as resealable bags, side seal bags, vertical form filled bags, vertical pouch packaging, end seal bags, lap seal bags and the like are contemplated.

In an embodiment, the film has a first outer layer directly adhered to a first surface of a first intermediate layer and a second outer layer is adhered to a first surface of a second intermediate layer, and a second surface of a the first intermediate layer is directly adhered to a first surface of an inner tear layer and a second surface of a the second intermediate layer is directly adhered to a second surface of the inner tear layer.

Figure 2:
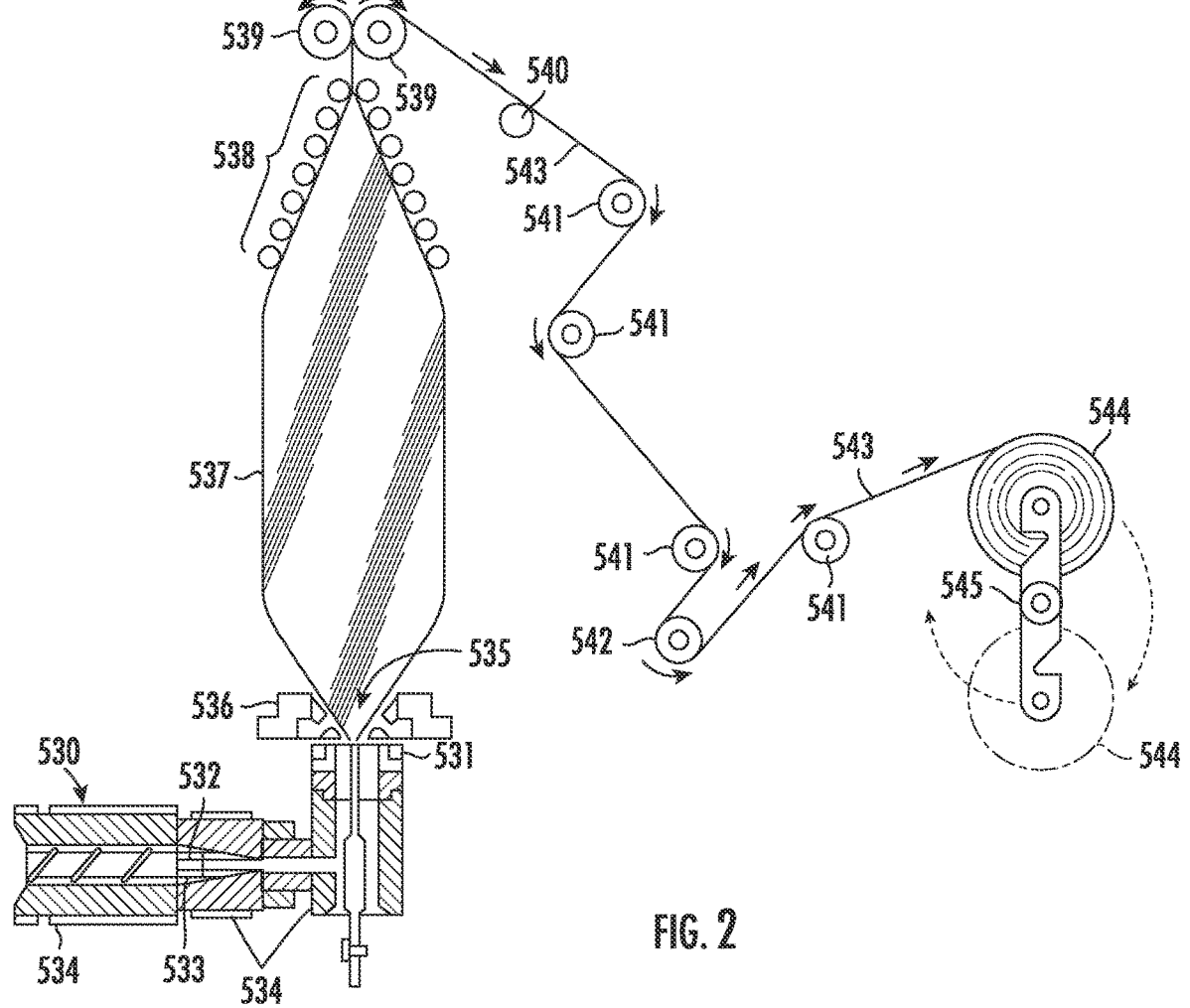
FIG. 2 is a schematic of a hot blown film process for making films in accordance with embodiments herein.

In embodiments, a film is produced by the blown film process illustrated in FIG. 2, which illustrates a schematic view of a process for making a "hot-blown" film, which is oriented in the melt state, and therefore is not heat-shrinkable. Although only one extruder 139 is illustrated in FIG. 2, it is understood that more than one extruder can be utilized to make the films.

In the process of FIG. 2, extruder 530 supplied molten polymer to annular die 531 for the formation of the film, which can be monolayer or multi-layer, depending upon the design of the die and the arrangement of the extruder(s) relative to the die, as known to those of skill in the art. Extruder 530 was supplied with polymer pellets suitable for the formation of the film. Extruder 530 subjected the polymer pellets to sufficient heat and pressure to melt the polymer and forward the molten stream through annular die 531.

Extruder 530 was equipped with screen pack 532, breaker plate 533, and heaters 534. The film was extruded between mandrel 535 and die 531, with the resulting extrudate being cooled by cool air from air ring 536. The molten extrudate was immediately blown into blown bubble 537, forming a melt oriented film. The melt oriented film cooled and solidified as it was forwarded upward along the length of bubble 537. After solidification, the film tubing passed through guide rolls 538 and was collapsed into lay-flat configuration by nip rolls 539. The collapsed film tubing was optionally passed over treater bar 540, and thereafter over idler rolls 541, then around dancer roll 542 which imparted tension control to collapsed film tubing 543, after which the collapsed film tubing 543 was wound up as roll 544 via winder 545.

In a non-limiting embodiment, the multi-layer film is a 5-layer symmetrical film in which the two outer layers are of the same composition and thickness, the two intermediate layers are of the same composition and thickness and the linear tear layer is between the two intermediate layers. In other non-limiting embodiments, the multi-layer film is an asymmetrical film.

Orientation

The film may be oriented in either the machine (i.e., longitudinal), the transverse direction, or in both directions (i.e., biaxially oriented), for example, to enhance the strength, optics, and durability of the film. A web or tube of the film may be uniaxially or biaxially oriented by imposing a draw force at a temperature where the film is softened (e.g., above the vicat softening point; see ASTM 1525) but at a temperature below the film's melting point. The film may then be quickly cooled to retain the physical properties generated during orientation and to provide a heat-shrink characteristic to the film. The film may be oriented using, for example, a tenter-frame process or a bubble process (double bubble, triple bubble and likewise). These processes are known to those of skill in the art, and therefore are not discussed in detail here. The orientation may occur in at least one direction by at least about, and/or at most about, any of the following ratios: 1.5:1, 2:1, 2.5:1, 3:1, 3.5:1, 4:1, 5:1, 6:1, 7:1, 8:1, 9:1, 10:1, 12:1, and 15:1.

The film may have a free shrink at 212° F. (100° C.) in at least one direction (e.g., the machine direction or the transverse direction) and/or in both the machine and transverse directions of at least about, and/or at most about, any of the following: 10%, 15%, 20%, 25%, 30%, 35% and 40%. The film may be annealed or heat-set to slightly or substantially reduce the free shrink of an oriented film. The free shrink of the film is determined by measuring the percent dimensional change in a 10 cm×10 cm film specimen when subjected to selected heat (i.e., at a specified temperature exposure) according to ASTM D 2732, which is incorporated herein in its entirety by reference. All references to free shrink in this application are measured according to this standard in oil. In embodiments, the film has a free shrink at 100° C. in at least one direction (e.g., the machine direction or the transverse direction) and/or in both the machine and transverse directions of between at least one of the following ranges: 10%-70%, 15%-65%, and 20%-60%, The film may have a free shrink at 248° F. (120° C.) in at least one direction (e.g., the machine direction or the transverse direction) and/or in both the machine and transverse directions of at least about, and/or at most about, any of the following: 50%, 55%, 60%, 65%, 70%, 75%, 80%, 85% and 90%. The film may be annealed or heat-set to slightly or substantially reduce the free shrink of an oriented film. The free shrink of the film is determined by measuring the percent dimensional change in a 10 cm×10 cm film specimen when subjected to selected heat (i.e., at a specified temperature exposure) according to ASTM D 2732, which is incorporated herein in its entirety by reference.

In embodiments, the multi-layer heat shrinkable film exhibits linear tear behavior when the tear is initiated in the machine direction. Linear tear behavior being tear propagation in a line of intended tear path with the film having reduced deviation from the line of intended tear path. The film is also able to be torn easily such that the package can be opened without the need for cutting or tools. In embodiments, the film has a tear initiation of less than 300 gf, less than 250 gf or less than 200 gf in the machine direction as measured in accordance with ASTM D-1004.

Optical Properties

Film transparency (also referred to herein as film clarity) was measured in accordance with ASTM D 1746-97 "Standard Test Method for Transparency of Plastic Sheeting", published April 1998, which is hereby incorporated, in its entirety, by reference thereto. The results are reported herein as "percent transparency". The multi-layer, heat-shrinkable film can exhibit a transparency of at least 65 percent, or at least 70 percent, or at least 75 percent, or at least 80 percent, measured using ASTM D 1746-97.

Film haze values were measured in accordance with ASTM D 1003-00 "Standard Test Method for Haze and Luminous Transmittance of Transparent Plastics", published July 2000, which is hereby incorporated, in its entirety, by reference thereto. The results are reported herein as "percent haze". The multi-layer, heat-shrinkable film can exhibit a haze of less than 8 percent, or less than 7 percent, or less than 6 percent, or less than 5 percent, or less than 4 percent measured using ASTM D 1003-00.

Film gloss values were measured in accordance with ASTM D 2457-97 "Standard Test Method for Specular Gloss of Plastic Films and Solid Plastics", published Jan. 10, 1997, which is hereby incorporated, in its entirety, by reference thereto. The results are reported herein as "percent gloss". The film can exhibit a gloss, as measured using ASTM D 2457-97, of from 60% to 100%, or from 70% to 90%.

Crosslinking

One or more of the layers of the film—or at least a portion of the entire film—may be cross-linked, for example, to improve the strength or change the melt or softening characteristics of the film. Cross-linking may be achieved by using chemical additives or by subjecting one or more film layers to one or more energetic radiation treatments—such as ultraviolet, or ionizing radiation such as X-ray, gamma ray, beta ray, and high energy electron beam treatment—to induce cross-linking between molecules of the irradiated material. Thereby creating a crosslinked polymeric composition. Useful ionizing radiation dosages include at least about, and/or at most about, any of the following: 5, 7, 10, 15, 20, 25, 30, 35, 40, 45, 50, 55, 60, 65, 70, 75, 80, 90, 100, 110, 120, 130, and 150 kGy (kiloGray). The cross-linking may occur before the orientation process, for example, to enhance the film strength before orientation, or the cross-linking may occur after the orientation process. In embodiments, the entire film is cross-linked by an ionizing radiation dosage of less than 100, 90, 80, 70, 60 or 50 kGy.

It may be desirable to avoid irradiating one or more film layers. To that end, one or more layers may be extruded, and irradiated, and subsequent layers may then be applied to the irradiated substrate, for example, by an extrusion coating process. This will produce an extrusion coating interface, with at least one layer substantially devoid of crosslinks.

Thermoplastic Film-Forming

The film may be manufactured by thermoplastic film-forming processes known in the art. The film may be prepared by extrusion or coextrusion utilizing, for example, a tubular trapped bubble film process or a flat film (i.e., cast film or slit die) process. The film may also be prepared by applying one or more layers by extrusion coating, adhesive lamination, extrusion lamination, solvent-borne coating, or by latex coating (e.g., spread out and dried on a substrate). A combination of these processes may also be employed.

All references to (and incorporations by reference of) ASTM protocols are to the most-recently published ASTM procedure as of the priority (i.e., original) filing date of this patent application in the United States Patent Office unless stated otherwise.

Tear Initiator

A tear initiator allows manual tearing force to be concentrated on a point or small region of the film, so that tear initiation and tear propagation can be produced manually. A slit in the film can serve as the tear initiator. Alternatively, the tear initiator can be a notch, a rounded notch, a rectangular notch, a slit hole, a round hole, a pointed oval hole, or a rectangular hole. Many shapes of slits and notches can serve as tear initiators. The tear initiator can be a member selected from the group consisting of a straight slit, a curved slit, a V-shaped notch, a U-shaped notch, and a Y-shaped notch-slit combination. In an embodiment, the tear initiator is oriented so that the tear can be manually initiated and manually propagated in a direction in which the film was extruded (i.e. the machine direction).

The tear initiator can be a cut in the film. As used herein, the term "cut" refers to the penetration through the film, or shearing through the film, with a shearing means or edged instrument. The term "cut" is inclusive of both slits and notches. As used herein, the term "slit" refers to a cut through the film without the separation and removal of a piece of film from the packaging article. A slit can be from the edge of the packaging article (i.e., an "edge slit") or internal, i.e., not extending to an edge (i.e., "internal slit" also referred to as a "slit hole"). The slit can be straight or curved or wavy.

Figure 3A:
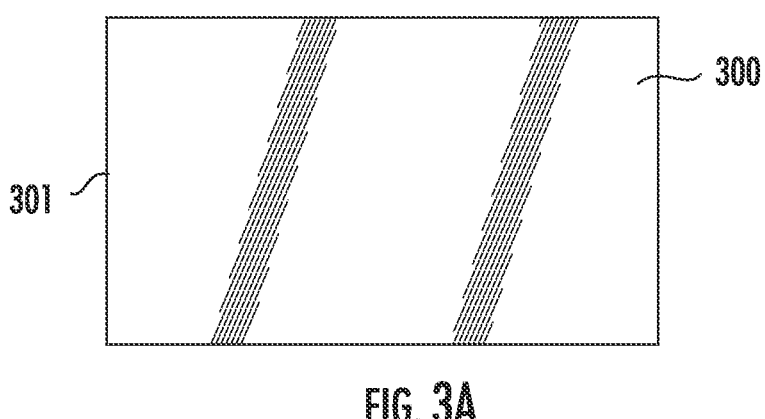
FIGS. 3A-3B are exemplary embodiments showing a film with good linear tear propagation in accordance with embodiments herein.
Figure 3B:
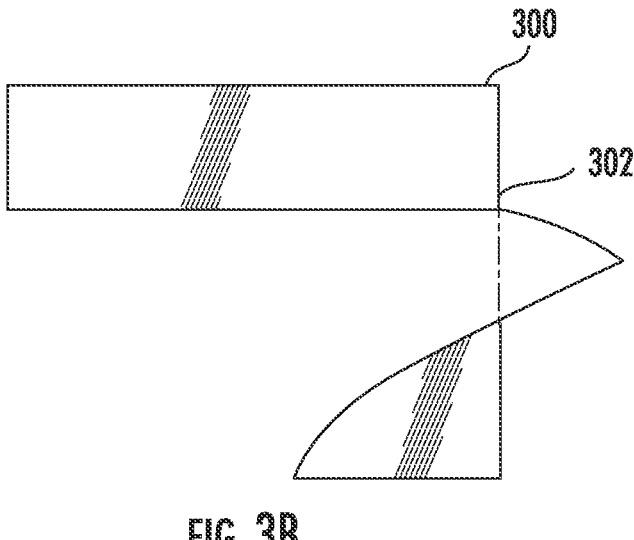
Figure 4:
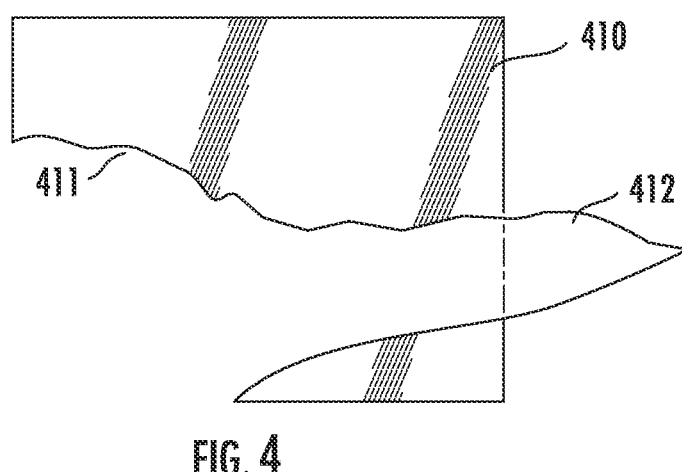
FIG. 4 is a comparative film showing poor linear tear propagation.

As shown in FIG. 3A a film 300 has a tear initiator slit 301. Upon tearing the film 300 and the tear initiator slit 301, the film propagates in a linear direction resulting in a constantly smooth tear 302 as shown in FIG. 3B. A film with poor tear properties is shown in FIG. 4. Once the film 410 is torn, the tear 410 is non-linear and random. The tear 412 also results in artifacts remaining on the film in a jagged fashion.

In addition to the tear initiator, the packaging article can be provided with "grip assister", also referred to herein as a "grip enhancer". The grip assister can enhance the ease with which the film can be torn. The grip assister can be a hole in the film, an integral extension of the film, or a separate film tab. The separate film tab can be made from a thermoplastic polymer, paper, or other material, and can be heat-shrinkable or non-heat-shrinkable. The packaging article can be provided with the combination of a tear-initiator and a grip-assister. For example, the film can have a slit as the tear-initiator and a hole as the grip-assister. The film can have two slits as a pair of tear initiator and a hole between the two slits serving as the grip assister. In embodiments, the grip assister can be a tab used in combination with a slit.

The term "hole", as used herein, includes both an internal puncture (i.e., internal hole) or internal cut (i.e., an internal slit) through the film, as well as an internal cut that removes a piece of film from the article. The hole can utilize a straight cut or a curved cut. The hole can be round or square or rectangular or irregular in shape.

A "notch" is formed by a cut that removes a piece of film along an otherwise straight or smooth curved edge, producing a point for stress concentration during the subsequent manual application of tearing force. A notch can be V-shaped or round or square or rectangular or oval or of any regular or irregular profile.

Packaged Product

Turning now to FIGS. 5A-5C an exemplary packaged product is show. The design and placement of features depicted in FIGS. 5A-5C is not intended to be limiting and merely illustrate an exemplary embodiment of a packaged product wrapped in a film as described herein. As show in FIG. 5A, a product box 501 is wrapped in a multi-layer film 502. The product box is depicted as a rectangular prism and holds another product inside. It is understood that the product box can be other shapes, including but not limited to spheres, cylinders, ellipsoids, cubes, triangular prisms, pyramids, other geometric shapes, or irregular shapes.

The film includes a pair of tear initiators 503 on a first surface 504 of the multi-layer film 502. The pair of tear initiators 503 are spaced apart from each other and are located below the upper surface 505 which is orthogonal to the first surface 504. In embodiments, the distance from the pair of tear initiators to the upper surface is at least 10 mm. In embodiments, the pair of tear initiators are spaced apart from each other by a distance of 5-100 mm. A grip assistor 506 is placed between the tear initiators 503. The grip assistor allows for a user to easily grasp the film and initiate tearing. In embodiments, the grip assistor is selected from the group consisting of hole in the multi-layer film, an integral extension of the multi-layer film, or a separate film tab.

To open the package, a force is applied to the grip assistor 506 and tear lines 507 begin to propagate from the tear initiators 503 as shown in FIG. 5B. The film tears in a linear fashion with minimal deviation from the intended tear lines 508 (depicted as dashed lines). The intended tear lines and tear initiators may be located along an edge of the packaged product. In other embodiments, and as depicted, the intended tear lines and tear initiators are spaced away from the edge of the packaged product.

As force continues to pull the grip assistor 506, the tear line 507 continue until the packed is opened and the product box 501 can be removed from the multi-layer film 502. The tear lines may continue through a portion of, or the entirety of the first surface 504. In other embodiments, the tear lines may continue past the edge of the first surface and continue tearing along the edge of a second surface.

Method of Making a Packaged Product

A method for packaging a product in the film disclosed herein is also contemplated. The packaged product is first wrapped in the film. The film may be provided a centerfold film, tubing or rollstock. The open end, or ends of the film are sealed by known methods such as heat sealing. Once sealed, the film is subjected to heat to cause the film to shrink around the product. The shrink removes wrinkles and gives an appeasing appearance to the product. In embodiments, the film shrinks at least any of the following values in at least one of a machine or traverse direction 4%, 5%, %, 6%, 7%, 8%, 9%, 10%, 11%, 12%, 13%, 14%, and 15%.

Tear initiators and grip assistors as described herein can further be incorporated in the packaging.

EXAMPLES

TABLE 1

| | | | | Melt flow rate g/ 10 min (190° C./ 02.16 kg) |
| | | Comonomer Content (%) | Density g/cm3 ASTM D1238 | ASTM D1238 |
|---|---|---|---|---|
| Code | Generic Name | | | |
| | Identity of Resins Used in Examples | | | |
| EVA1 | Ethylene/Vinyl Acetate Copolymer | 2.5 | | |
| EVA2 | Ethylene/Vinyl Acetate Copolymer | 14.5 | | |
| MDPE | Medium Density Polyethylene | | 0.935 | 2.5 |
| LLDPE | Linear Low Density Polyethylene | | 0.92 | 1 |
| EPC1 | Ethylene Propylene Copolymer | | 0.90 | 7.5 (@230° C.) |
| EPC2 | Ethylene Propylene Copolymer | 11 (Ethylene) | 0.874 | 2.5 (@230° C.) |
| EPC3 | Ethylene Propylene Copolymer | | 0.90 | 7.25 (@230° C.) |
| AB1 | AntiBlock-Ceramic Spheres | | | |
| MB1 | Masterbatch | | | |
| MB2 | Masterbatch | | | |

MB1 is a masterbatch blend in 91.5 wt % EVA1 blended with slip, antiblock and lubricant.

MB2 is a masterbatch blend in 92.3 wt % EVA1 blended with slip and antiblock.

Multi-layer films were made by a blown extrusion process as described and depicted in FIG. 1 above and with a steam can oven in place of hot water bath tank 118. The films were irradiated at the level indicated in parentheticals.

16

TABLE 2

| | | Film | | | | | |
|---|---|---|---|---|---|---|---|
| | Layer | 1 | 2 | 3 | 4 | 5 | Total |
| Film 1 (45 kGy) | | 14.8 wt % EVA1 | 14.8 wt % EVA1 | 70 wt % EPC1 | 14.8 wt % EVA1 | 14.8 wt % EVA1 | |
| | | 24.3 wt % MDPE | 24.3 wt % EPC1 | 30 wt % LLDPE | 24.3 wt % EPC1 | 24.3 wt % MDPE | |
| | | 48.9 wt % LLDPE | 48.9 wt % LLDPE | | 48.9 wt % LLDPE | 48.9 wt % LLDPE | |
| | | 12.0 wt % MB1 | 12.0 wt % MB2 | | 12.0 wt % MB2 | 12.0 wt % MB1 | |
| | Thickness (%) | 12.5 | 12.5 | 50 | 12.5 | 12.5 | 100 |
| | Thickness (mils) | 0.09 | 0.09 | 0.35 | 0.09 | 0.09 | 0.70 |
| Film 2 (45 kGy) | | 14.8 wt % EVA1 | 14.8 wt % EVA1 | 50 wt % EPC2 | 14.8 wt % EVA1 | 14.8 wt % EVA1 | |
| | | 24.3 wt % MDPE | 24.3 wt % MDPE | 50 wt % LLDPE | 24.3 wt % MDPE | 24.3 wt % MDPE | |
| | | 48.9 wt % LLDPE | 48.9 wt % LLDPE | | 48.9 wt % LLDPE | 48.9 wt % LLDPE | |
| | | 12.0 wt % MB1 | 12.0 wt % MB2 | | 12.0 wt % MB2 | 12.0 wt % MB1 | |
| | Thickness (%) | 12.5 | 12.5 | 50 | 12.5 | 12.5 | 100 |
| | Thickness (mils) | 0.075 | 0.075 | 0.30 | 0.075 | 0.075 | 0.60 |
| Film 3 (45 kGy) | | 14.8 wt % EVA1 | 14.8 wt % EVA1 | 70 wt % EPC2 | 14.8 wt % EVA1 | 14.8 wt % EVA1 | |
| | | 24.3 wt % MDPE | 24.3 wt % EPC2 | 30 wt % EVA2 | 24.3 wt % EPC2 | 24.3 wt % MDPE | |
| | | 48.9 wt % LLDPE | 48.9 wt % LLDPE | | 48.9 wt % LLDPE | 48.9 wt % LLDPE | |
| | | 12.0 wt % MB1 | 12.0 wt % MB2 | | 12.0 wt % MB2 | 12.0 wt % MB1 | |
| | Thickness (%) | 12.5 | 12.5 | 50 | 12.5 | 12.5 | 100 |
| | Thickness (mils) | 0.09 | 0.09 | 0.35 | 0.09 | 0.09 | 0.70 |
| Film 4 (50 kGy) | | 14.8 wt % EVA1 | 14.8 wt % EVA1 | 70 wt % EPC3 | 14.8 wt % EVA1 | 14.8 wt % EVA1 | |
| | | 24.3 wt % MDPE | 24.3 wt % EPC3 | 30 wt % LLDPE | 24.3 wt % EPC3 | 24.3 wt % MDPE | |
| | | 48.9 wt % LLDPE | 48.9 wt % LLDPE | | 48.9 wt % LLDPE | 48.9 wt % LLDPE | |
| | | 12.0 wt % MB1 | 12.0 wt % MB2 | | 12.0 wt % MB2 | 12.0 wt % MB1 | |
| | Thickness (%) | 12.5 | 12.5 | 50 | 12.5 | 12.5 | 100 |
| | Thickness (mils) | 0.09 | 0.09 | 0.35 | 0.09 | 0.09 | 0.70 |
| Film 5 (50 kGy) | | 14.8 wt % EVA1 | 14.8 wt % EVA1 | 70 wt % EPC1 | 14.8 wt % EVA1 | 14.8 wt % EVA1 | |
| | | 24.3 wt % MDPE | 24.3 wt % EPC1 | 30 wt % LLDPE | 24.3 wt % EPC1 | 24.3 wt % MDPE | |
| | | 48.9 wt % LLDPE | 48.9 wt % LLDPE | | 48.9 wt % LLDPE | 48.9 wt % LLDPE | |
| | | 12.0 wt % MB1 | 12.0 wt % MB2 | | 12.0 wt % MB2 | 12.0 wt % MB1 | |
| | Thickness (%) | 12.5 | 12.5 | 50 | 12.5 | 12.5 | 100 |
| | Thickness (mils) | 0.09 | 0.09 | 0.35 | 0.09 | 0.09 | 0.70 |

Various physical properties of the films were tested and reported below in Table 3.

TABLE 3

| | | | | Film properties | | |
|---|---|---|---|---|---|---|
| Attribute | Test method | Film 1 | Film 2 | Film 3 | Film 4 | Film 5 |
| Young's Modulus (Kg/cm$^2$) (L-T) | ASTM D-882 | 6226-6582 | 2820-3210 | 2650-2380 | 7610-7450 | 7300-7470 |
| Tensile @ break (Kg/cm$^2$) (L-T) | ASTM D-882 | 1143-1160 | 1010-958 | 787-592 | 1230-1150 | 1190-1150 |
| Elongation @ break (%) (L-T) | ASTM D-882 | 152-135 | 140-130 | 120-95 | 140-140 | 150-130 |
| Tear propagation (gf) (L-T) | ASTM D-1938 | 4-3 | 10-24 | 10-40 | 17-6 | 4-5 |
| Tear initiation (gf) (L-T) | ASTM D-1004 | 174-176 | 213-256 | 180-219 | 181-180 | 163-140 |
| COF static (Int/Met) (Kgf) | ASTM D-1894 | 0.16 | 0.16 | 0.20 | 0.13 | 0.14 |
| COF Kinetic (Int/Met) (Kgf) | ASTM D-1894 | 0.16 | 0.16 | 0.20 | 0.14 | 0.14 |
| COF static (Int/Int)(Kgf) | ASTM D-1894 | 0.16 | 0.15 | 0.29 | 0.20 | 0.20 |
| COF Kinetic (Int/Int) (Kgf) | ASTM D-1894 | 0.14 | 0.15 | 0.17 | 0.14 | 0.13 |
| Free shrink at 100° C. in oil (L-T) % | ASTM D-2732 | 19-29 | 18-28 | 17-26 | 15-26 | 16-28 |
| Free shrink at 120° C. in oil (L-T) % | ASTM D-2732 | 57-64 | 76-75 | 73-70 | 45-57 | 47-59 |
| Haze (%) | ASTM D-1746 | 3.3 | 3.9 | 3.5 | 3.9 | 3.7 |
| Transmittance (%) | ASTM D-1003 | 93.3 | | 93.0 | 93.1 | 93.3 |
| Clarity (%) | ASTM D-1746 | 98.4 | 96.6 | 96.3 | 97.6 | 97.4 |

Angled Tear Deviation Test

Figure 6A:
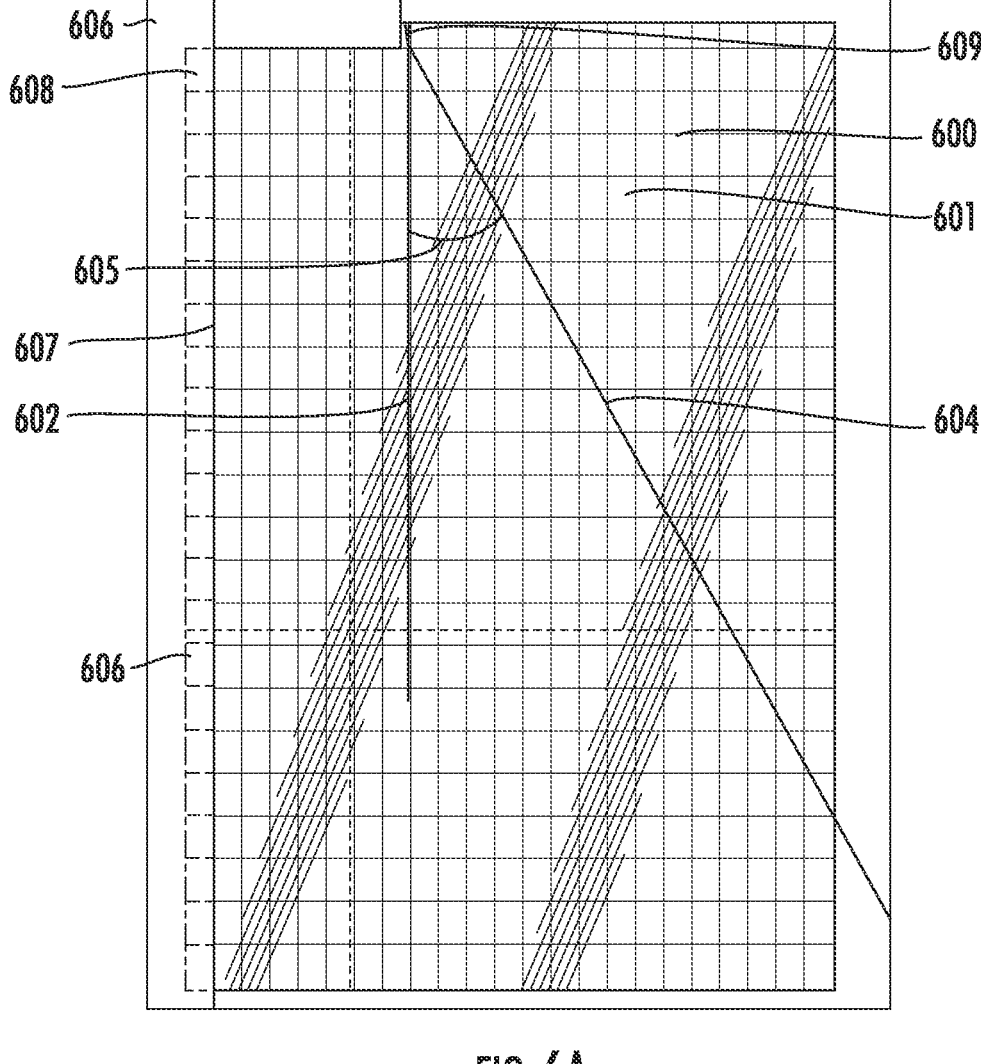
FIGS. 6A-6B are representations of the Angled Tear Deviation Test described herein.

Film samples were tested in accordance with the Angled Tear Deviation Test as described below. Referring to FIGS. 6A-61B a grid 600 is provided. Each minor square being 0.93 mm in width and height. Each major grid mark encompassing a 10×10 section of minor grid squares. The major grid marks are 9.3 mm in size. It is understood that a grid of different units can be used, for example, a grid in which each square is 1 mm. The desired linear tear path 602 extends along the Y-axis for a distance of at least 13 cm. A tear force will be applied to a film 601 along the angled tear path 604. The angled tear path 604 being offset from the desired linear tear path 602 by an angle 605 of 26.6°. A 17.8 cm×17.8 cm square of film 601 is affixed to the grid. The size of the film is larger than the test area to avoid any edge effects that may impact the measurements. The film is affixed with tape 606 which extends beyond the film, but could be affixed by any suitable means to not allow unintended movement of the film. The film 601 should at least be secured along the first edge 607 and a portion of the upper surface 608 of the film 601. Tape 606 extends along the upper surface 608 until reaching the line shown as the desired linear tear path 602. A 1 cm slit 609 is cut in the film along the desired linear tear path 602 to act as a tear initiator. The film is oriented such that the desired linear tear path is in either machine or transverse directions. The upper surface 608 of the film 601 to the right of the desired linear tear path 602 is left unaffixed to allow for tearing of the film 601. The film is then grasped to by the upper surface 608 just to the right of the slit 609.

Figure 6B:
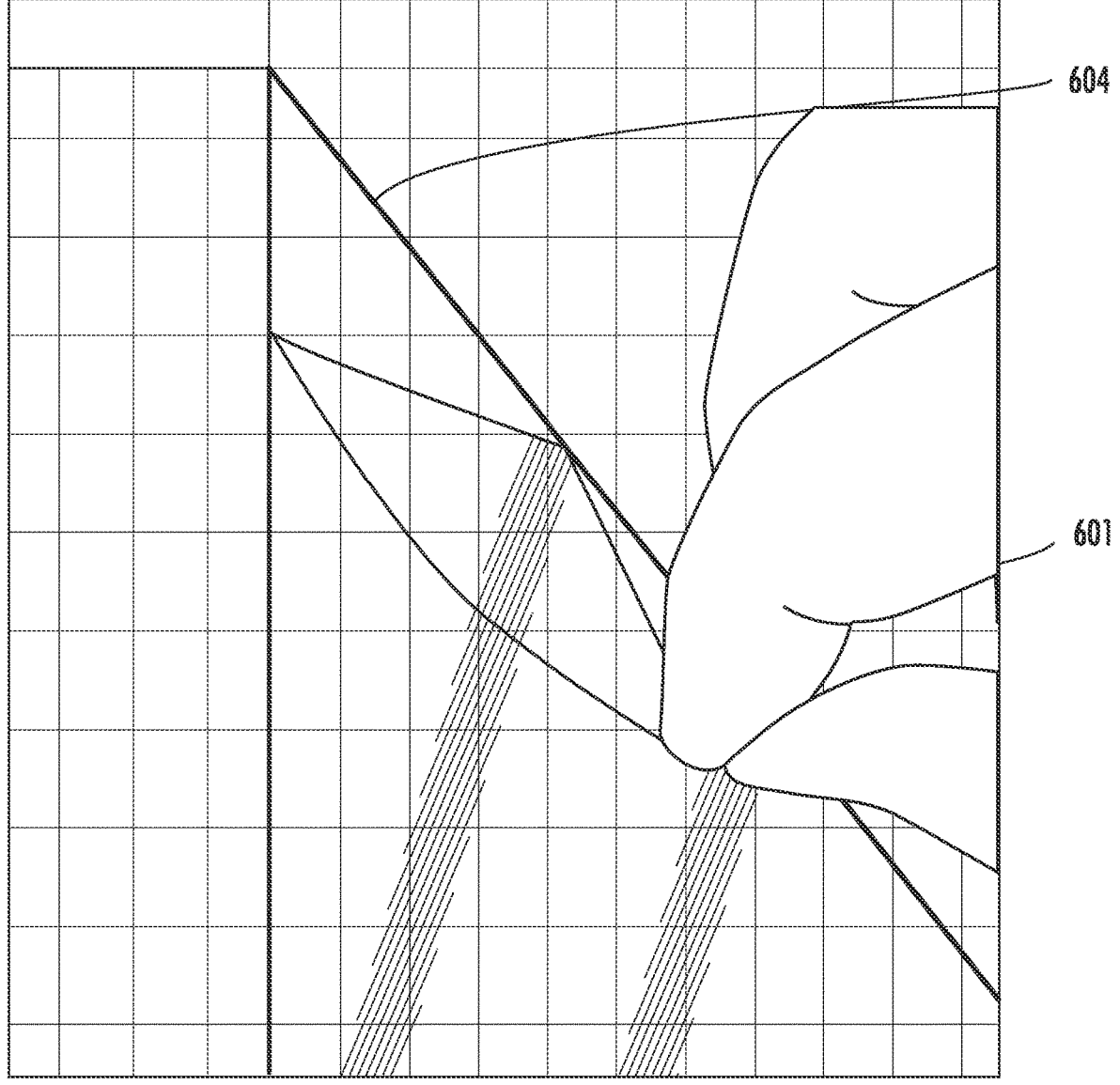

A tear force is then applied by pulling the film 601 along the angled tear path 604 until the film tears at least the desired distance. In the case of the examples below, 13 cm. The film 601 being torn along the angled tear path 604 is depicted in FIG. 6B.

Figure 7:
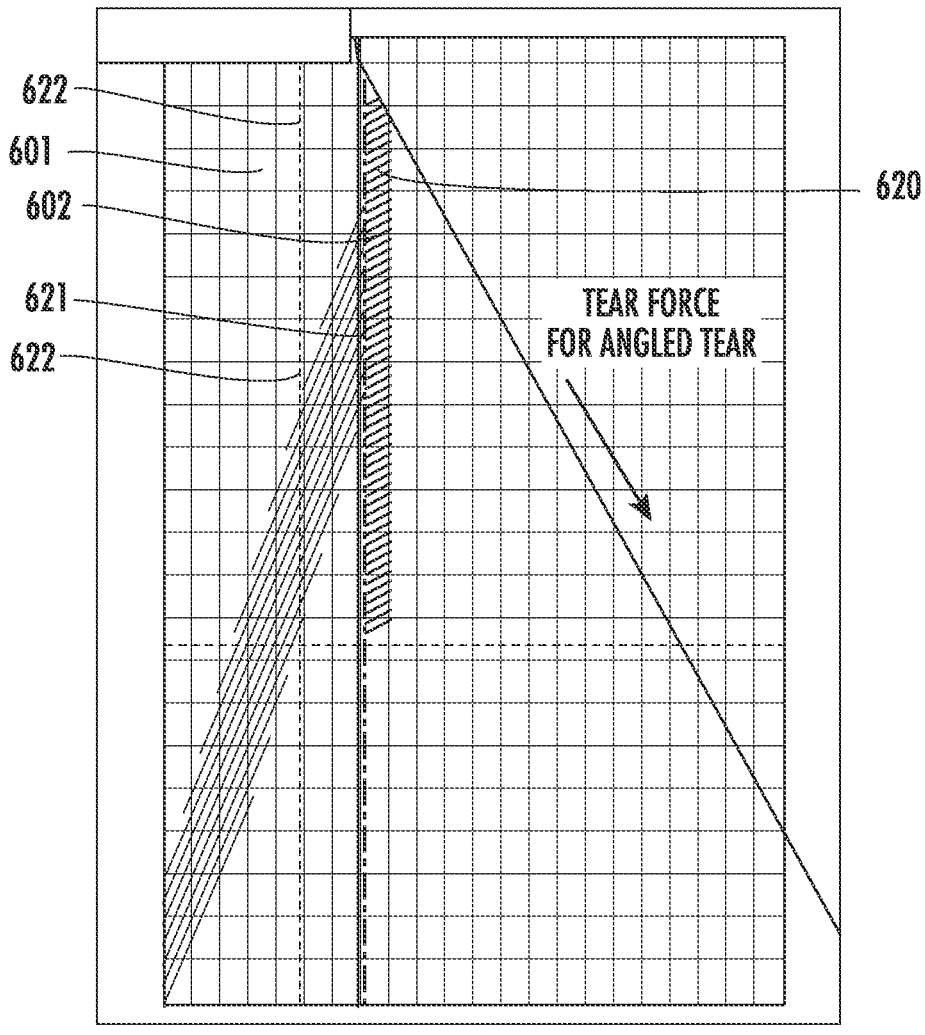
FIG. 7 depicts an exemplary film exhibiting good linear tear behavior on the Angled Tear Deviation Test described herein.

Once the film 601 has been torn, measurements can be obtained. Turning now to FIG. 7 is a film that exhibits good linear tear behavior. The film portion remaining after tearing remains affixed to the grid 600. Marking 620 are made along the tear edge 621 of the film 601 remaining after tearing the film. The film 601 prevents markings 620 from appearing on the grid 600. The portion of film that is removed allows for the markings 620 to appear on the grid 600. Thereby the distance from the tear edge 621 of the film 601 to the desired linear tear path 602 can be easily identified. Measurements can be taken at each increment 622 to determine the distance from the desired linear tear path 602 to the tear edge 621 as identified by the markings 620.

Figure 8:
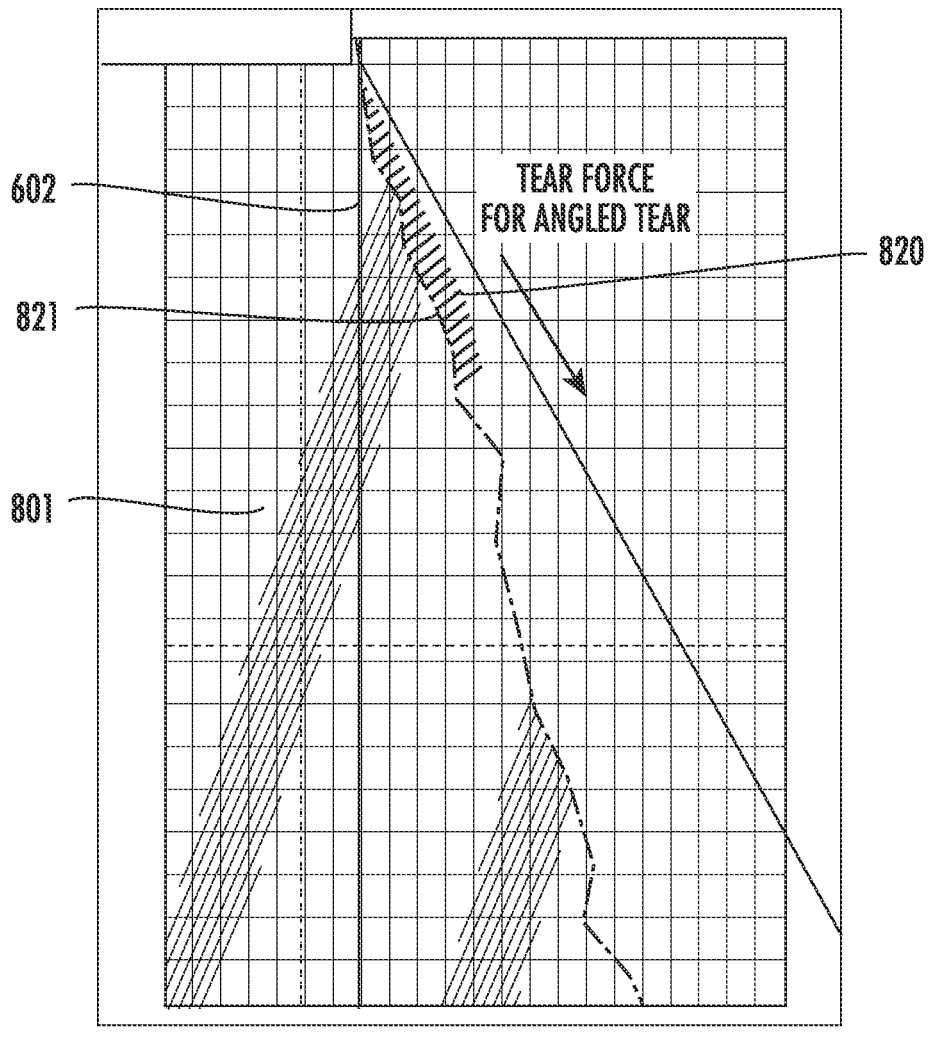
FIG. 8 depicts an exemplary film exhibiting poor linear tear behavior on the Angled Tear Deviation Test described herein

Turning now to FIG. 8 is a film 801 that has been torn in the Angled Tear Deviation Test which exhibits poor linear tear behavior. The film 801 was subjected to the same Angled Tear Deviation Test as film 601. The marking 820 provide a visual representation of the tear edge 820 of film 801. The tear edge 820 starts near the desired linear tear path 602, however quickly drifts further away as the tear edge 820 propagates.

The Angled Tear Deviation Test results in three measurements to gauge the linear tear propagation of the film reported below. The three measurements being Angled Tear Deviation, Angled Tear Average Deviation and Angled Tear Deviation Area, each of which is discussed.

Angled Tear Deviation

The Angled Tear Deviation is calculated at a given point on the Y-axis (such as the increments 622 as shown in FIG. 7). The Angled Tear Deviation is calculated by measuring the distance from the desired linear tear path 602 to the location of the tear edge 622 (FIG. 7) along the X-axis.

Angled Tear Average Deviation

The Angled Tear Average Deviation is calculated by taking the sum of the Angled Tear Deviation values which are taken at equal increments along the Y-axis from and dividing by the total by the total number of increments. At least 10 increments should be used to ensure a good sampling. Increments may be taken every centimeter or even more frequently. As shown in FIG. 7, 14 increments are used and are spaced apart by 9.3 mm. The formula for Angled Tear Average Deviation as reported in Table 4 is as follows:

$$\text{Angled Tear Average Deviation} = (\text{Angled Tear Deviation at } 1^{st} \text{ increment} + \text{Angled Tear Deviation at } 2^{nd} \text{ increment} + \text{Angled Tear Deviation at } 3^{rd} \text{ increment} + \text{Angled Tear Deviation at } 4^{th} \text{ increment} + \text{Angled Tear Deviation at } 5^{th} \text{ increment} + \text{Angled Tear Deviation at } 6^{th} \text{ increment} + \text{Angled Tear Deviation at } 7^{th} \text{ increment} + \text{Angled Tear Deviation at } 8^{th} \text{ increment} + \text{Angled Tear Deviation at } 9^{th} \text{ increment} + \text{Angled Tear Deviation at } 10^{th} \text{ increment} + \text{Angled Tear Deviation at } 11^{th} \text{ increment} + \text{Angled Tear Deviation at } 12^{th} \text{ increment} + \text{Angled Tear Deviation at } 13^{th} \text{ increment} + \text{Angled Tear Deviation at } 14^{th} \text{ increment}) + 14$$

Angled Tear Deviation Area

Angled Tear Deviation Area is an estimate of the total amount of film area that fails to tear along the desired linear tear path. The tear deviation from each increment on the Y-axis is treated as if it was a linear change, even if this is not the actual case. The Angled Tear Deviation Area is calculated by adding the sum of the estimated area between each increment. The estimated area between each increment being calculated by multiplying the distance between each increment by the Angled Tear Deviation values taken at that increment. The formula being as follows:

$$\text{Angled Tear Deviation Area} = (\text{Angled Tear Deviation at } 1^{st} \text{ increment} \times \text{increment distance}) + (\text{Angled Tear Deviation at } 2^{nd} \text{ increment} \times \text{increment distance}) + (\text{Angled Tear Deviation at } 3^{rd} \text{ increment} \times \text{increment distance}) + (\text{Angled Tear Deviation at } 4^{th} \text{ increment} \times \text{increment distance}) + (\text{Angled Tear Deviation at } 5^{th} \text{ increment} \times \text{increment distance}) + (\text{Angled Tear Deviation at } 6^{th} \text{ increment} \times \text{increment distance}) + (\text{Angled Tear Deviation at } 7^{th} \text{ increment} \times \text{increment distance}) + (\text{Angled Tear Deviation at } 8^{th} \text{ increment} \times \text{increment distance}) + (\text{Angled Tear Deviation at } 9^{th} \text{ increment} \times \text{increment distance}) + (\text{Angled Tear Deviation at } 10^{th} \text{ increment} \times \text{increment distance}) + (\text{Angled Tear Deviation at } 11^{th} \text{ increment} \times \text{increment distance}) + (\text{Angled Tear Deviation at } 12^{th} \text{ increment} \times \text{increment distance}) + (\text{Angled Tear Deviation at } 13^{th} \text{ increment} \times \text{increment distance}) + (\text{Angled Tear Deviation at } 14^{th} \text{ increment} \times \text{increment distance}).$$

In embodiments the multi-layer film has an Angled Tear Deviation Area when torn in at least one of the machine or transverse directions of not more than at least one of the values selected from 150 mm$^2$, 200 mm$^2$, 250 mm$^2$, 300 mm$^2$, 350 mm$^2$, 400 mm$^2$, 450 mm$^2$, 500 mm$^2$, 550 mm$^2$, 600 mm$^2$, 650 mm$^2$, 700 mm$^2$, 750 mm$^2$ and 800 mm$^2$.

Five samples of Film 1 where tested via the Angled Tear Deviation Test. The increment being 9.3 mm. The average results of the five samples are reported below in Table 4.

TABLE 4

| | | | | |
|---|---|---|---|---|
| Tear Data | | | | |
| | Film 1 | Film 3 | Film 4 | Film 5 |
| Angled Tear Deviation at $1^{st}$ increment | 0.12 mm | 0.10 mm | 0.02 mm | 0.12 mm |
| Angled Tear Deviation at $2^{nd}$ increment | 0.22 mm | 0.30 mm | 0.02 mm | 0.18 mm |
| Angled Tear Deviation at $3^{rd}$ increment | 0.34 mm | 0.60 mm | 0.02 mm | 0.26 mm |
| Angled Tear Deviation at $4^{th}$ increment | 0.46 mm | 0.88 mm | 0.06 mm | 0.34 mm |
| Angled Tear Deviation at $5^{th}$ increment | 0.58 mm | 1.06 mm | 0.12 mm | 0.48 mm |
| Angled Tear Deviation at $6^{th}$ increment | 0.68 mm | 1.18 mm | 0.16 mm | 0.56 mm |
| Angled Tear Deviation at $7^{th}$ increment | 0.80 mm | 1.26 mm | 0.22 mm | 0.68 mm |
| Angled Tear Deviation at $8^{th}$ increment | 0.94 mm | 1.32 mm | 0.24 mm | 0.82 mm |
| Angled Tear Deviation at $9^{th}$ increment | 1.02 mm | 1.44 mm | 0.30 mm | 0.92 mm |
| Angled Tear Deviation at $10^{th}$ increment | 1.14 mm | 1.52 mm | 0.30 mm | 1.08 mm |
| Angled Tear Deviation at $11^{th}$ increment | 1.24 mm | 1.56 mm | 0.34 mm | 1.30 mm |
| Angled Tear Deviation at $12^{th}$ increment | 1.36 mm | 1.56 mm | 0.34 mm | 1.44 mm |
| Angled Tear Deviation at $13^{th}$ increment | 1.46 mm | 1.5 mm | 0.36 mm | 1.64 mm |
| Angled Tear Deviation at $14^{th}$ increment | 1.6 mm | 1.52 mm | 0.38 mm | 1.84 mm |
| Angled Tear Average Deviation | 0.85 mm | 1.13 mm | 0.21 mm | 0.83 mm |
| Angled Tear Deviation Area of 13 cm tear | 111 mm$^2$ | 147 mm$^2$ | 27 mm$^2$ | 108 mm$^2$ |

Cuttability was tested by removing a 5-foot swatch from a film roll. The film was folded in half widthwise which is the same action as a film center folding machine only being performed by hand instead. Since the films tested are symmetrical films no attention is paid to abuse or seal side.

The films were placed on a SeleCTech machine and run at the following conditions: Set end seal temperature to 230° C. Set end seal temperature to 230° C. Set Dwell to 0.8 and pressure to 0.6 MPa. Allow SeleCtech machine to reach proper end seal temperature. Place folded film directly under end seal bar.

After seal process, check to see if the film is still connected and has not completely separated from the equipment. Small film attachments to the machine are considered a failure and is deemed not cuttable. There is a dissention between tack back and incomplete cut as one is not related to the other. Tack back is a product of too much time and or heat applied to the film via cutting blade or bar.

Five samples were tested for each film. If any of the five samples result in incomplete cuts, the film is deemed not cuttable. If all five samples are cut, the film is deemed cuttable. Table 5 below represents a Yes for a complete cut and a No for incomplete or no cuts.

TABLE 5

| Cutting performance | | | | | |
|---|---|---|---|---|---|
| Film | 1 | 2 | 3 | 4 | 5 |
| Cut | Yes | No | No | Yes | Yes |

As shown in Table 5 films having a tear propagation in the transversal direction of less than 9 gf exhibited good cutting performance. Those films with higher tear propagation in the transversal direction did not cut in the test described above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A packaged product comprising:
   a. a first product;
   b. a multi-layer film shrunk to an outer surface of the first product;
      the multi-layer film comprising:
      a first outer layer having a first thickness;
      a second outer layer having a second thickness; and
      an inner layer comprising a blend of between 60-80 wt % polypropylene copolymer and between 20-40 wt % of an ethylene copolymer;
      a first intermediate layer disposed between the first outer layer and the inner layer; and
      a second intermediate layer disposed between the second outer layer and the inner layer;
      wherein the inner layer has a thickness that is at least 45% the thickness of the multi-layer film;
      the multi-layer film having at least one tear initiator to initiate tear propagation of the multi-layer film along a tear line;
      the multi-layer film having an Angled Tear Deviation Area when torn in at least one of the machine or transverse directions of not more than 800 mm², the Angled Tear Deviation Area being calculated from a 13 cm tear with a tear force applied at an angle of 26.6° offset from a desired linear tear path and measured in accordance an Angled Tear Deviation Test.

2. The packaged product of claim 1, wherein the first product is a box containing a second product.

3. The packaged product of claim 1 wherein the first product is rectangular prism shaped.

4. The packaged product of claim 1 wherein the multi-layer film comprises a pair of tear initiators on a first surface of the packaged product.

5. The packaged product of claim 4 wherein the pair of tear initiators are spaced away from an upper surface of the packaged product by at least 10 mm and are positioned on a surface orthogonal to the upper surface of the packaged product.

6. The packaged product of claim 4 wherein pair of tear initiators intimate linear tear propagation in a first plane and the pair of tear initiators are spaced apart in a second plane orthogonal to the first plane by a distance of 5-100 mm.

7. The packaged product of claim 4 wherein a grip assistor is disposed between the pair of tear initiators.

8. The packaged product of claim 1 wherein the multi-layer film is a 5-layer symmetrical film.

9. The packaged product of claim 1 wherein the thickness of the inner layer is between 45 and 80% of the thickness of the multi-layer film.

10. The packaged product of claim 1 wherein the first outer layer is directly adhered to a first surface of the first intermediate layer and the second outer layer is adhered to a first surface of the second intermediate layer, and a second surface of a the first intermediate layer is directly adhered to a first surface of the inner layer and a second surface of a the second intermediate layer is directly adhered to a second surface of the inner layer.

11. The packaged product of claim 1 wherein the first outer layer comprises at least 50, 60, 70 wt % ethylene copolymer.

12. The packaged product of claim 11 wherein the first outer layer further comprises at least 9 wt % ethylene/vinyl acetate copolymer.

13. The packaged product of claim 1 wherein the multi-layer film has a tear initiation of less than 300 gf, less than 250 gf or less than 200 gf in the machine direction as measured in accordance with ASTM D-1004-21.

14. A multi-layer film comprising
   a. a first outer layer having a first thickness;
   b. a second outer layer having a second thickness; and
   c. an inner layer comprising a blend of between 60-80 wt % polypropylene copolymer and between 20-40 wt % of an ethylene copolymer;
   d. a first intermediate layer disposed between the first outer layer and the inner layer; and
   e. a second intermediate layer disposed between the second outer layer and the inner layer;
   wherein the inner layer has a thickness that is at least 45% the thickness of the multi-layer film;
   the multi-layer film having an Angled Tear Deviation Area when torn in at least one of the machine or transverse directions of not more than 800 mm², the Angled Tear Deviation Area being calculated from a 13 cm tear with a tear force applied at an angle of 26.6° offset from a desired linear tear path and measured in accordance an Angled Tear Deviation Test.

15. The multi-layer film of claim 14 wherein the inner layer is between 45% and 75% the thickness of the multi-layer film.

16. The multi-layer film of claim 14 wherein the first outer layer is directly adhered to a first surface of the first intermediate layer and the second outer layer is adhered to a first surface of the second intermediate layer, and a second surface of a the first intermediate layer is directly adhered to a first surface of the inner layer and a second surface of a the second intermediate layer is directly adhered to a second surface of the inner layer.

17. The multi-layer film of claim 14 wherein the multi-layer film has a tear initiation of less than 300 gf in the machine direction as measured in accordance with ASTM D-1004-21.

18. The multi-layer film of claim 14 wherein the multi-layer film has a free shrink at 100° C. in at least one of the machine direction or the transverse direction of between 10%-70% free shrink measuring according to ASTM D 2732-14R20.

19. The multi-layer film of claim 14 wherein the multi-layer film has a haze of less than 5 percent measured in accordance with ASTM D 1003-21 and a clarity of at least 70 percent measured in accordance with ASTM D 1746-15.

20. A method for packaging a product comprising the steps of:

24 a. providing a first product;
b. wrapping the first product in a multi-layer film;
  the multi-layer film comprising:
  a first outer layer having a first thickness;
  a second outer layer having a second thickness; and
  an inner layer comprising a blend of between 60-80 wt % polypropylene copolymer and between 20-40 wt % of an ethylene copolymer;
  a first intermediate layer disposed between the first outer layer and the inner layer; and
  a second intermediate layer disposed between the second outer layer and the inner layer;
    wherein the inner layer has a thickness that is at least 45% the thickness of the multi-layer film;
    the multi-layer film having an Angled Tear Deviation Area when torn in at least one of the machine or transverse directions of not more than 800 mm$^2$, the Angled Tear Deviation Area being calculated from a 13 cm tear with a tear force applied at an angle of 26.6° offset from a desired linear tear path and measured in accordance an Angled Tear Deviation Test
c. sealing the multi-layer film;
d. shrinking the multi-layer film to cause the multi-layer film to fit taught around the first product.

\* \* \* \* \*